US012794884B2

(12) United States Patent
Kuravangi-Thammaiah et al.

(10) Patent No.: US 12,794,884 B2
(45) Date of Patent: Nov. 10, 2026

(54) SYSTEMS AND METHODS FOR SECURELY STORING SESSION KEYS

(71) Applicant: Verizon Patent and Licensing Inc., Basking Ridge, NJ (US)

(72) Inventors: Shanthala Kuravangi-Thammaiah, Keller, TX (US); Vinod Kumar Choyi, Conshohocken, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 18/343,492

(22) Filed: Jun. 28, 2023

(65) Prior Publication Data

US 2025/0007909 A1 Jan. 2, 2025

(51) Int. Cl.
*H04L 9/40* (2022.01)

(52) U.S. Cl.
CPC ........ *H04L 63/0876* (2013.01); *H04L 63/061* (2013.01)

(58) Field of Classification Search
CPC .......................... H04L 63/0876; H04L 63/061
See application file for complete search history.

(56) References Cited

U.S. PATENT DOCUMENTS

| | | | | |
|---|---|---|---|---|
| 8,024,560 B1 * | 9/2011 | Alten | H04L 63/0428 | 713/193 |
| 2003/0070067 A1 * | 4/2003 | Saito | H04L 63/0435 | 713/150 |
| 2010/0325435 A1 * | 12/2010 | Park | H04L 9/0844 | 713/171 |
| 2016/0119318 A1 * | 4/2016 | Zollinger | H04L 9/3242 | 713/171 |
| 2017/0163607 A1 * | 6/2017 | Skuratovich | H04L 63/0428 | |
| 2017/0265069 A1 * | 9/2017 | Palanigounder | H04W 84/04 | |
| 2018/0332471 A1 * | 11/2018 | Zhu | H04L 63/061 | |
| 2021/0058780 A1 * | 2/2021 | Yu | H04W 12/08 | |
| 2023/0042442 A1 * | 2/2023 | Kim | H04L 63/0876 | |

* cited by examiner

*Primary Examiner* — Khoi V Le

(57) ABSTRACT

In some implementations, a device may generate a session key and a session key identifier that is associated with the session key. The device may transmit, to a unified data repository (UDR), an authentication status message, wherein the authentication status message indicates the session key and the session key identifier for storage in the UDR.

20 Claims, 8 Drawing Sheets

100

SYSTEMS AND METHODS FOR SECURELY STORING SESSION KEYS

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications. "Downlink" (or "DL") refers to a communication link from the network node to the UE, and "uplink" (or "UL") refers to a communication link from the UE to the network node.

DETAILED DESCRIPTION OF EXAMPLE EMBODIMENTS

Figure 1:
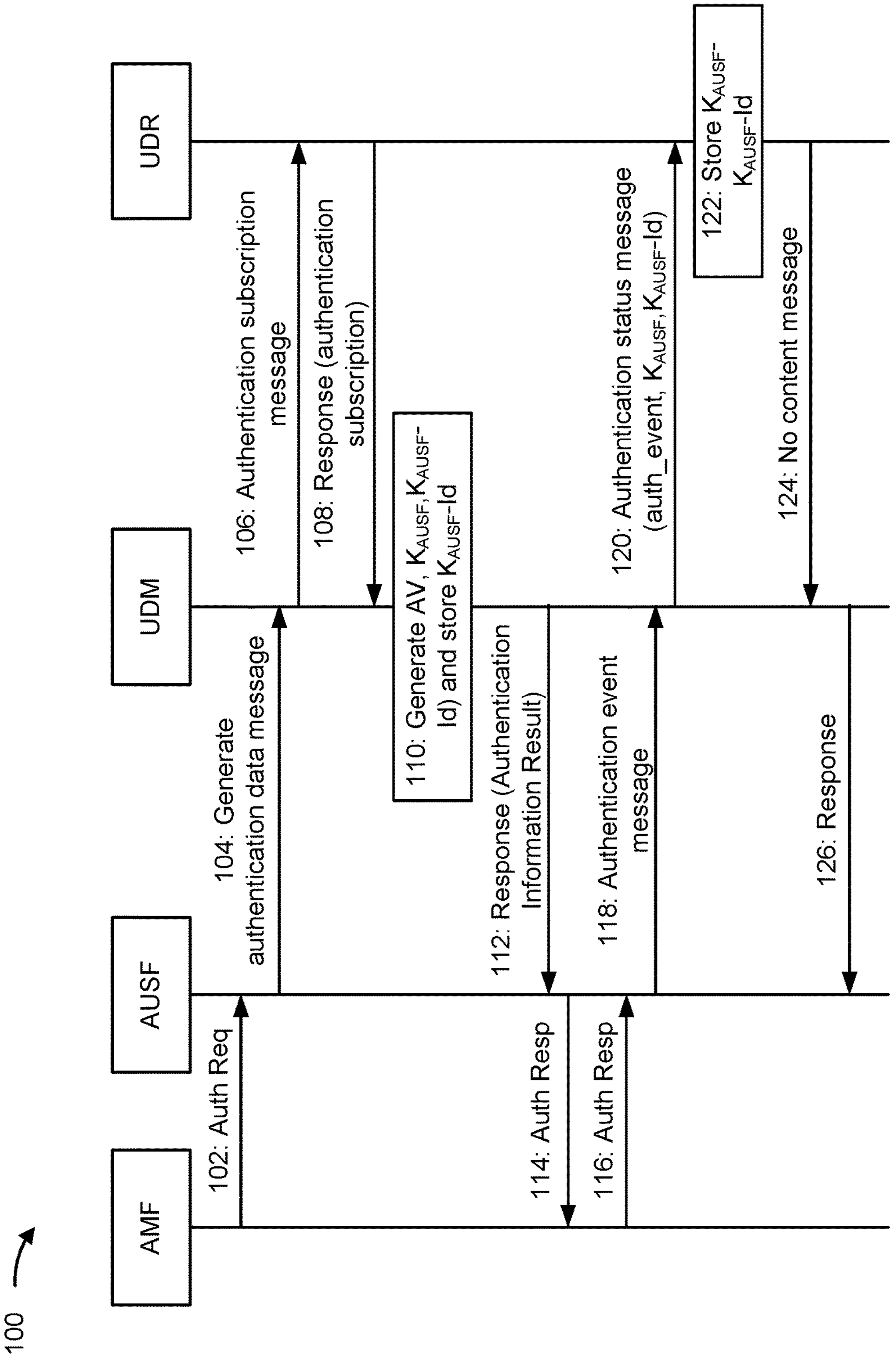
FIG. 1 is a diagram of an example associated with securely storing a session key in a unified data repository (UDR) by a unified data management (UDM).

The following detailed description of example implementations refers to the accompanying drawings. The same reference numbers in different drawings may identify the same or similar elements.

In a wireless communication system, an authentication credential repository and processing function (ARPF) may be a functional element of a unified data management (UDM). The UDM may be responsible for the storage and management of user subscription data and authentication data. The ARPF/UDM may generate a home environment authentication vector. The ARPF/UDM may provide the home environment authentication vector to an authentication server function (AUSF). The home environment authentication vector may indicate a $K_{AUSF}$, which may be a root key or a master session key that is only available to the AUSF. The $K_{AUSF}$ may be used for the purpose of authenticating a user equipment (UE) using an authentication and key agreement (AKA) protocol. The $K_{AUSF}$ may be derived based on a cipher key (CK), an integrity key (IK), a sequence number (SQN), and/or a serving public land mobility network (PLMN). The AUSF may use the $K_{AUSF}$ to generate other security keys, such as a KSEAF, which may be associated with a security anchor function (SEAF), or a KAKMA, which may be associated with authentication and key management for applications (AKMA). The AUSF may locally store the $K_{AUSF}$. In other words, the $K_{AUSF}$ may be locally stored at the AUSF. Further, the AUSF may maintain and update a subscription permanent identifier (SUPI)-to-$K_{AUSF}$ mapping.

When a network function (NF) needs to perform a subsequent key generation, the NF must identify the AUSF that has the $K_{AUSF}$. When the NF needs to perform a subsequent key generation or utilize a protection service, such as a steering of roaming (SoR) service, based on the $K_{AUSF}$, the NF may need to discover the AUSF that has the $K_{AUSF}$. For a relatively large network operator, a wireless network may include multiple AUSFs. The NF, such as an SoR application function (AF) or AKMA anchor function (AAnF), may discover an appropriate AUSF, from the multiple AUSFs, based on a SUPI. For example, the NF may discover the appropriate AUSF, from the multiple AUSFs, based on the SUPI-to-$K_{AUSF}$ mapping. However, the need to discover the appropriate AUSF, from the multiple AUSFs, may increase signaling, latency and overall network transactions per second (TPS). The increased network TPS may lead to greater power consumption by the wireless network. Further, when the multiple AUSFs are needed in the wireless network, multiple subscriber databases may need to be maintained, which may increase complexity in the wireless network.

In some implementations, a UDM may generate a session key ($K_{AUSF}$) and a session key identifier (ID) ($K_{AUSF}$-Id) that is associated with the session key. The UDM may transmit, to a unified data repository (UDR), an authentication status message that indicates the session key and the session key identifier for storage in the UDR. In some implementations, an AUSF may receive, from the UDM, a response that indicates the session key and the session key identifier. The AUSF may transmit, to the UDR, an authentication status message that indicates the session key and the session key identifier for storage in the UDR. In other words, either the UDM or the AUSF may initiate the storage of the session key and the session key identifier in the UDR.

In some implementations, an ARPF/UDM capability may be enhanced, such that an ARPF/UDM may be able to store the $K_{AUSF}$ in the UDR when the ARPF/UDM generates home environment authentication vectors. In some implementations, an AUSF capability may be enhanced, such that the AUSF may be able to directly store the $K_{AUSF}$ in the UDR after completing a successful authentication. An enhanced UDR resource structure may be used to store the $K_{AUSF}$. The AUSF may be provided with a capability to directly retrieve the $K_{AUSF}$ from the UDR. In some implementations, the UDM may be provided with a capability to directly retrieve the $K_{AUSF}$ from the UDR and pass the $K_{AUSF}$ to the AUSF in an Nausf protection service (e.g., Nausf SoR protection). The UDM may generate the $K_{AUSF}$-Id, which may be a pseudo-random value or a decorated ID that is used to uniquely identify the $K_{AUSF}$. The UDM may store the $K_{AUSF}$-Id locally. The UDM may send the $K_{AUSF}$-Id to be stored within the UDR along with the associated $K_{AUSF}$. In order to retrieve the $K_{AUSF}$ associated with a UE from the UDR, the UDM may send the $K_{AUSF}$-Id that has been stored locally to obtain the appropriate $K_{AUSF}$ from the UDR.

In some implementations, the $K_{AUSF}$ may be securely stored in the UDR, and the AUSF and/or the UDM may securely access the $K_{AUSF}$ from the UDR. A reliance on a specific AUSF to obtain a subsequent NF key or Nausf protection services may be avoided (e.g., a stickiness to the specific AUSF may be removed), which may reduce latency and overall network TPS. For example, the $K_{AUSF}$ may no longer be locally stored on the specific AUSF that is one of multiple AUSFs in a wireless network, which may remove the reliance on the specific AUSF when obtaining the subsequent NF key or Nausf protection services. AUSFs in the wireless network may be stateless, and thus may enable increased agility in the wireless network. Further, since the $K_{AUSF}$ may be stored in the UDR, instead of locally on a particular AUSF, any AUSF of the multiple AUSFs may serve any SUPI and use the $K_{AUSF}$, as the $K_{AUSF}$ may be referenced by the $K_{AUSF}$-Id. An ability for any AUSF of the multiple AUSFs to serve any SUPI may reduce latency and overall network TPS, thereby improving an overall performance of the wireless network.

FIG. 1 is a diagram of an example 100 associated with securely storing a session key in a UDR by a UDM. As shown in FIG. 1, example 100 includes an access and mobility management function (AMF) (e.g., AMF 524, described below and shown in FIG. 5), an AUSF (e.g., AUSF 516), a UDM (e.g., UDM 514), and a UDR (e.g., UDR 512). "UDM" may refer to a UDM device, a UDM function, a UDM entity, and/or a UDM service. Further, the UDM may be associated with an ARPF.

As shown by reference number 102, in a $K_{AUSF}$ storage in the UDR by the UDM, the AMF may transmit an authentication request to the AUSF. As shown by reference number 104, the AUSF may transmit a generate authentication data message (e.g., Post . . . /nudm-ueau/ . . . /generate_auth_data) to the UDM. As shown by reference number 106, the UDM may transmit an authentication subscription message (e.g., Get . . . /nudr-dr/ . . . /authentication-data/auth-subscription) to the UDR. As shown by reference number 108, the UDR may transmit a response (e.g., 200ok(authentication Subscription) to the UDM, where the response may indicate an authentication subscription. As shown by reference number 110, the UDM may generate, based on the response, an authentication vector (AV) (e.g., a home environment authentication vector), a $K_{AUSF}$, which may be a root key or a master session key, and a $K_{AUSF}$-Id, which may be an ID associated with $K_{AUSF}$. The UDM may or may not locally store the $K_{AUSF}$-Id. The UDM may store the $K_{AUSF}$ when the UDM generates the authentication vector.

As shown by reference number 112, the UDM may transmit a response (e.g., 200ok(AuthInfoResult(RAND, AUTN,XRES*,$K_{AUSF}$))) to the AUSF, where the response may indicate an authentication information result. The authentication information result may include a random number (RAND) (also referred to as a random nonce challenge), an authentication token (AUTN), an expected response (XRES), and a $K_{AUSF}$. As shown by reference number 114, the AUSF may transmit an authentication response to the AMF. As shown by reference number 116, the AMF may transmit an authentication response to the AUSF. As shown by reference number 118, the AUSF may transmit an authentication event message (e.g., Post . . . /nudm-ueau/ . . . /auth_event) to the UDM. As shown by reference number 120, the UDM may transmit an authentication status message (e.g., PUT . . . /nudr-dr/ . . . /authentication-data/auth-status (auth_event, $K_{AUSF}$, $K_{AUSF}$-Id)) to the UDR. The authentication status message may indicate an authentication event, the $K_{AUSF}$, and the $K_{AUSF}$-Id. The UDM may store the $K_{AUSF}$-Id locally, and the UDM may transmit the $K_{AUSF}$-Id to be stored, along with the associated $K_{AUSF}$, in the UDR. As shown by reference number 122, the UDR may locally store the $K_{AUSF}$ and the $K_{AUSF}$-Id. The $K_{AUSF}$ and/or the $K_{AUSF}$-Id may be stored on the UDR, instead of on the AUSF. The UDR may locally store the $K_{AUSF}$ and the $K_{AUSF}$-Id that were indicated in the authentication status message. The UDR may store the $K_{AUSF}$ and/or the $K_{AUSF}$-Id using an enhanced UDR resource structure. As shown by reference number 124, the UDR may transmit a no content message (e.g., 204 No Content) to the UDM. As shown by reference number 126, the, the UDM may transmit a response (e.g., 201ok (AuthEvent)) to the AUSF.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
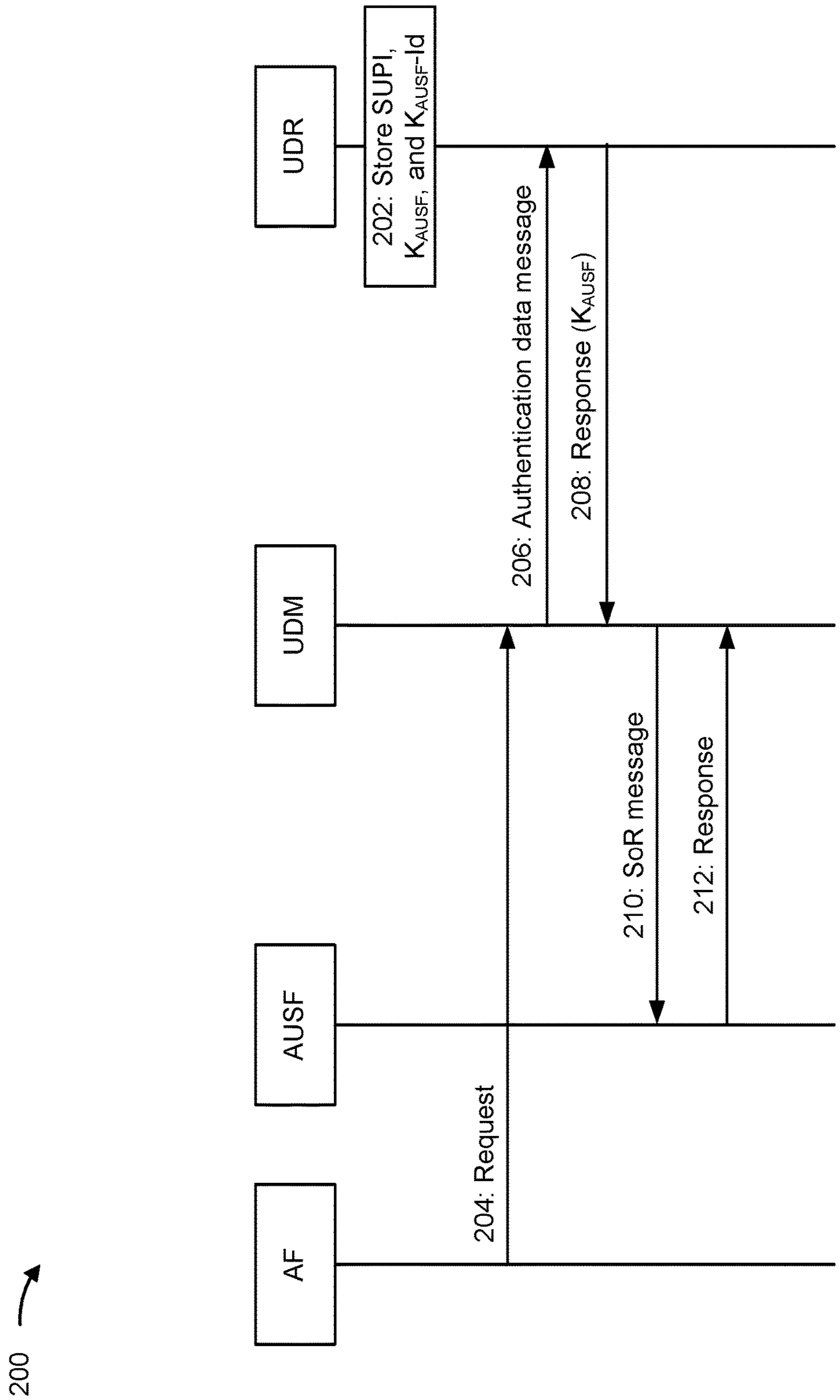
FIG. 2 is a diagram of an example associated with retrieving a session key from a UDR by a UDM.

FIG. 2 is a diagram of an example 200 associated with retrieving a session key from a UDR by a UDM. As shown in FIG. 2, example 200 includes an AF (e.g., AF 520), such as an SoR application function (SoR-AF) (e.g., SoR-AF 530), an AUSF (e.g., AUSF 516), a UDM (e.g., UDM 514), and a UDR (e.g., UDR 512).

As shown by reference number 202, in a $K_{AUSF}$ retrieval by the UDM from the UDR, a SUPI, a $K_{AUSF}$, and a corresponding $K_{AUSF}$-Id may be stored by the UDR (e.g., using an enhanced UDR resource structure). As shown by reference number 204, the AF may transmit a request (e.g., Nsoraf_SoR) to the UDM. As shown by reference number 206, the UDM may transmit an authentication data message (e.g., Get . . . /nudr-dr/ . . . /authentication-data/ . . . /$K_{AUSF}$-Id) to the UDR, where the authentication data message may indicate the $K_{AUSF}$-Id. As shown by reference number 208, the UDR may transmit a response (e.g., 200ok ($K_{AUSF}$)) to the UDM. The response may indicate the $K_{AUSF}$, and the UDR may transmit the response based on the $K_{AUSF}$-Id indicated in the authentication data message. As a result, the $K_{AUSF}$ may be retrieved from the UDR by the UDM. In order to retrieve the $K_{AUSF}$ associated with a UE from the UDR, the UDM may transmit the $K_{AUSF}$-Id that has been stored locally to obtain the appropriate $K_{AUSF}$ from the UDR. As shown by reference number 210, the UDM may transmit an SoR message (e.g., Nsoraf_SoR_Protection_Service (SoR-Info, $K_{AUSF}$)) to the AUSF, which may indicate SoR information and the $K_{AUSF}$. The UDM may directly retrieve the $K_{AUSF}$ from the UDR, and the UDM may relay the $K_{AUSF}$ to the AUSF, which may be associated with an Nausf SoR protection service. As shown by reference number 212, the AUSF may transmit a response (e.g., 200ok (protected SoR-Info)) to the UDM, which may indicate protected SoR information.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
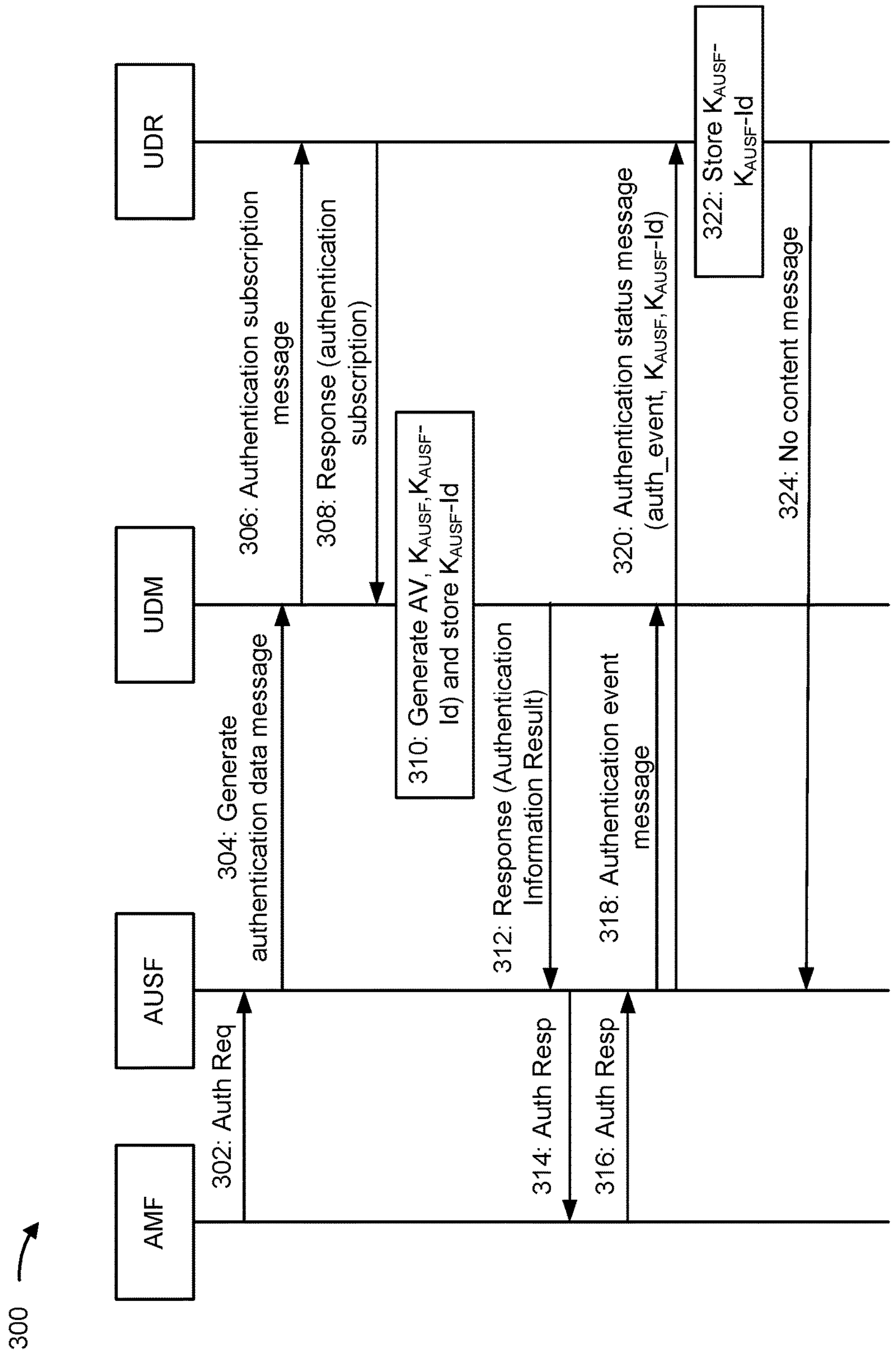
FIG. 3 is a diagram of an example associated with securely storing a session key in a UDR by an authentication server function (AUSF).

FIG. 3 is a diagram of an example 300 associated with securely storing a session key in a UDR by an AUSF. As shown in FIG. 3, example 300 includes an AMF (e.g., AMF 524), an AUSF (e.g., AUSF 516), a UDM (e.g., UDM 514), and a UDR (e.g., UDR 512).

As shown by reference number 302, in a $K_{AUSF}$ storage in the UDR by the AUSF, the AMF may transmit an authentication request to the AUSF. As shown by reference number 304, the AUSF may transmit a generate authentication data message (e.g., Post . . . /nudm-ueau/ . . . /generate_auth_data) to the UDM. As shown by reference number 306, the UDM may transmit an authentication subscription message (e.g., Get . . . /nudr-dr/ . . . /authentication-data/auth-subscription) to the UDR. As shown by reference number 308, the UDR may transmit a response (e.g., 200ok(authentication Subscription) to the UDM, where the response may indicate an authentication subscription. As shown by reference number 310, the UDM may generate, based on the response, an authentication vector, a $K_{AUSF}$, which may be a root key or a master session key, and a $K_{AUSF}$-Id, which may be an ID associated with the $K_{AUSF}$. The UDM may or may not locally store the $K_{AUSF}$-Id. The UDM may store the $K_{AUSF}$ when the UDM generates the authentication vector.

As shown by reference number 312, the UDM may transmit a response (e.g., 200ok (AuthInfoResult (RAND, AUTN, XRES*, $K_{AUSF}$))) to the AUSF, where the response may indicate an authentication information result. The authentication information result may include a random number (RAND) (also referred to as a random nonce challenge), an authentication token (AUTN), an expected response (XRES), and a $K_{AUSF}$. As shown by reference number 314, the AUSF may transmit an authentication response to the AMF. As shown by reference number 316, the AMF may transmit an authentication response to the AUSF. As shown by reference number 318, the AUSF may transmit an authentication event message (e.g., Post . . . /nudm-ueau/ . . . /auth_event) to the UDM. As shown by reference number 320, the AUSF may transmit an authentication status message (e.g., PUT . . . /nudr-dr/ . . . /authentication-data/auth-status (auth_event, $K_{AUSF}$, $K_{AUSF}$-Id)) to the UDR. The authentication status message may indicate an authentication event, the $K_{AUSF}$, and the $K_{AUSF}$-Id. The AUSF may transmit the $K_{AUSF}$-Id to be stored, along with the associated $K_{AUSF}$, in the UDR. As shown by reference number 322, the UDR may locally store the $K_{AUSF}$ and the $K_{AUSF}$-Id. The $K_{AUSF}$ and/or the $K_{AUSF}$-Id may be stored on the UDR, instead of on the AUSF. The UDR may locally store the $K_{AUSF}$ and the $K_{AUSF}$-Id that were indicated in the authentication status message. The UDR may store the $K_{AUSF}$ and/or the $K_{AUSF}$-Id using an enhanced UDR resource structure. As shown by reference number 324, the UDR may transmit a no content message (e.g., 204 No Content) to the AUSF.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
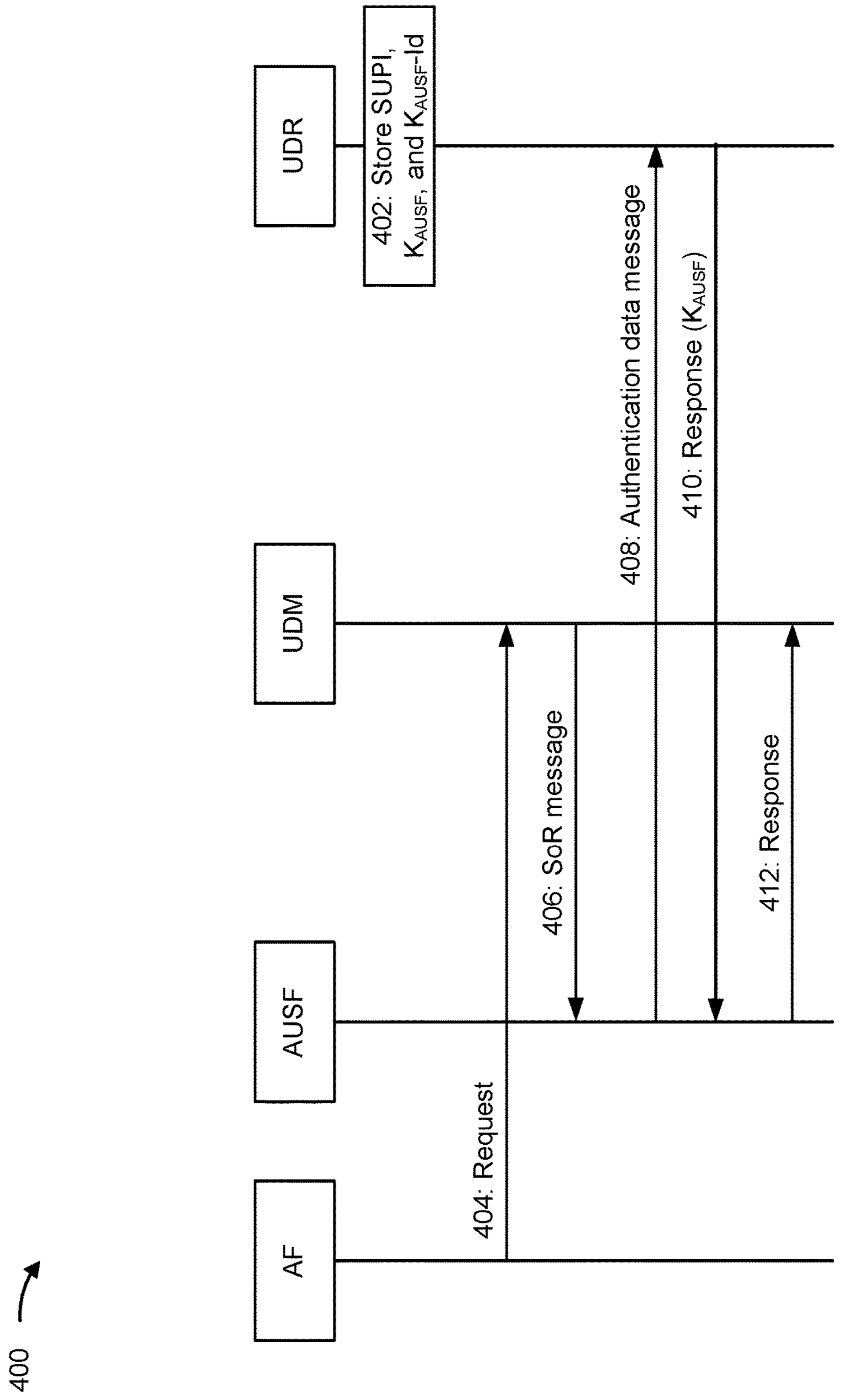
FIG. 4 is a diagram of an example associated with retrieving a session key from a UDR.

FIG. 4 is a diagram of an example 400 associated with retrieving a session key from a UDR. As shown in FIG. 4, example 400 includes an AF (e.g., AF 520), such as an SoR-AF (e.g., SoR-AF 530), an AUSF (e.g., AUSF 516), a UDM (e.g., UDM 514), and a UDR (e.g., UDR 512).

As shown by reference number 402, in a $K_{AUSF}$ retrieval by the AUSF from the UDR, a SUPI, a $K_{AUSF}$, and a corresponding $K_{AUSF}$-Id may be stored by the UDR (e.g., using an enhanced UDR resource structure). As shown by reference number 404, the AF may transmit a request (e.g., Nsoraf_SoR) to the UDM. As shown by reference number 406, the UDM may transmit an SoR message (e.g., Nsoraf_SoR_Protection_Service (SoR-Info, $K_{AUSF}$)) to the AUSF, which may indicate SoR information and the $K_{AUSF}$. As shown by reference number 408, the AUSF may transmit an authentication data message (e.g., Get . . . /nudr-dr/ . . . /authentication-data/ . . . /$K_{AUSF}$-Id) to the UDR, where the authentication data message may indicate the $K_{AUSF}$-Id. In order to retrieve the $K_{AUSF}$ associated with a UE from the UDR, the AUSF may transmit the $K_{AUSF}$-Id to obtain the appropriate $K_{AUSF}$ from the UDR. As shown by reference number 410, the UDR may transmit a response (e.g., 200ok ($K_{AUSF}$)) to the AUSF. The response may indicate the $K_{AUSF}$, and the UDR may transmit the response based on the $K_{AUSF}$-Id indicated in the authentication data message. As a result, the $K_{AUSF}$ may be retrieved from the UDR by the AUSF. The AUSF may directly retrieve the $K_{AUSF}$ from the UDR based on the authentication data message and the response. As shown by reference number 412, the AUSF may transmit a response (e.g., 200ok (protected SoR-Info)) to the UDM, which may indicate protected SoR information.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
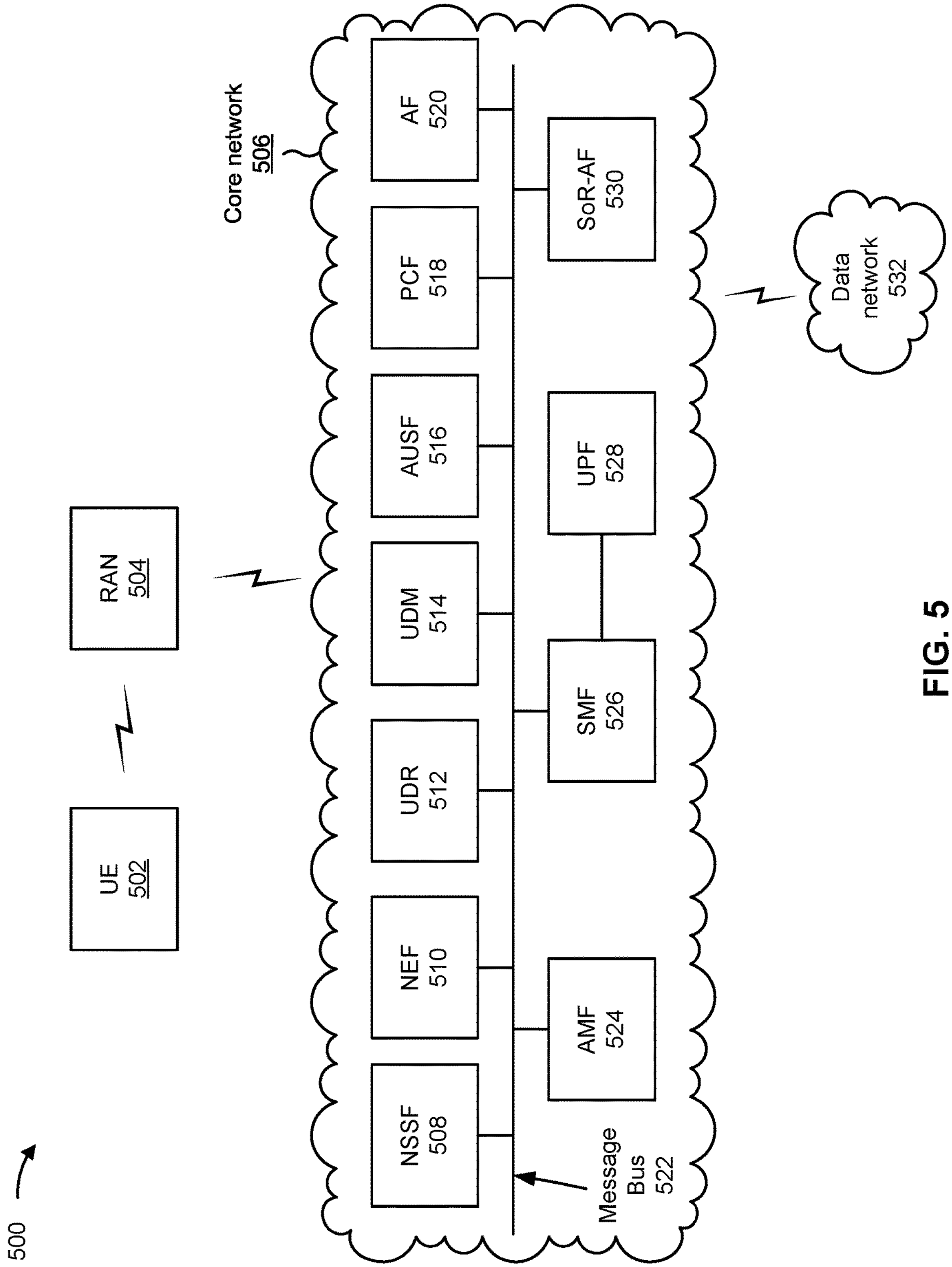
FIG. 5 is a diagram of an example environment in which systems and/or methods described herein may be implemented.

FIG. 5 is a diagram of an example environment 500 in which systems and/or methods described herein may be implemented. As shown in FIG. 5, example environment 500 may include a UE 502, a RAN 504, a core network 506, and a data network 532. Devices and/or networks of example environment 500 may interconnect via wired connections, wireless connections, or a combination of wired and wireless connections.

The UE 502 may include one or more devices capable of receiving, generating, storing, processing, and/or providing information, such as information described herein. For example, The UE 502 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 504 may support, for example, a cellular radio access technology (RAT). The RAN 504 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 502. The RAN 504 may transfer traffic between the UE 502 (e.g., using a cellular RAT), one or more base stations (e.g., using a wireless interface or a backhaul interface, such as a wired backhaul interface), and/or the core network 506. The RAN 504 may provide one or more cells that cover geographic areas.

In some implementations, the RAN 504 may perform scheduling and/or resource management for the UE 502 covered by the RAN 504 (e.g., the UE 502 covered by a cell provided by the RAN 504). In some implementations, the RAN 504 may be controlled or coordinated by a network controller, which may perform load balancing, network-level configuration, and/or other operations. The network controller may communicate with the RAN 504 via a wireless or wireline backhaul. In some implementations, the RAN 504 may include a network controller, a self-organizing network (SON) module or component, or a similar module or component. In other words, the RAN 504 may perform network control, scheduling, and/or network management functions (e.g., for uplink, downlink, and/or sidelink communications of the UE 502 covered by the RAN 504).

In some implementations, the core network 506 may include an example functional architecture in which systems and/or methods described herein may be implemented. For example, the core network 506 may include an example architecture of a fifth generation (5G) next generation (NG) core network included in a 5G wireless telecommunications system. While the example architecture of the core network 506 shown in FIG. 5 may be an example of a service-based architecture, in some implementations, the core network 506 may be implemented as a reference-point architecture and/or a 4G core network, among other examples.

As shown in FIG. 5, the core network 506 include a number of functional elements. The functional elements may include, for example, a network slice selection function (NSSF) 508, a network exposure function (NEF) 510, a UDR 512, a UDM 514, an AUSF 516, a policy control function (PCF) 518, an application function (AF) 520, an AMF 524, a session management function (SMF) 526, a user plane function (UPF) 528, and/or an SoR-AF 530. These functional elements may be communicatively connected via a message bus 522. Each of the functional elements shown in FIG. 5 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 508 may include one or more devices that select network slice instances for the UE 502. By providing network slicing, the NSSF 508 may allow an operator to deploy multiple substantially independent end-to-end networks potentially with the same infrastructure. In some implementations, each slice may be customized for different services. The NEF 510 may include one or more devices that support exposure of capabilities and/or events in the wireless telecommunications system to help other entities in the wireless telecommunications system discover network services.

The UDR 512 may include one or more devices that provide a converged repository, which may be used by network functions to store data. For example, a converged repository of subscriber information may be used to service a number of network functions. The UDM 514 may include one or more devices to store user data and profiles in the wireless telecommunications system. The UDM 514 may generate AKA authentication vectors, perform user identification handling, perform subscription management, and perform other various functions. The UDM 514 may be used for fixed access and/or mobile access in the core network 506. The AUSF 516 may include one or more devices that act as an authentication server and support the process of authenticating the UE 502 in the wireless telecommunications system.

The PCF 518 may include one or more devices that provide a policy framework that incorporates network slicing, roaming, packet processing, and/or mobility management, among other examples. The AF 520 may include one or more devices that support application influence on traffic routing, access to the NEF 510, and/or policy control, among other examples. The AMF 524 may include one or more devices that act as a termination point for non-access stratum (NAS) signaling and/or mobility management, among other examples. The SMF 526 may include one or more devices that support the establishment, modification, and release of communication sessions in the wireless telecommunications system. For example, the SMF 526 may configure traffic steering policies at the UPF 528 and/or may enforce user equipment IP address allocation and policies, among other examples. The UPF 528 may include one or more devices that serve as an anchor point for intra-RAT and/or inter-RAT mobility. The UPF 528 may apply rules to packets, such as rules pertaining to packet routing, traffic reporting, and/or handling user plane quality of service (QOS), among other examples. The SoR-AF 530 may offer an SoR service to NF consumers (e.g., the UDM 514), which may enable the retrieval of SoR information (e.g., a list of preferred PLMN/access technology combinations to be conveyed to the UE 502. The message bus 522 may represent a communication structure for communication among the functional elements. In other words, the message bus 522 may permit communication between two or more functional elements.

The data network 532 may include one or more wired and/or wireless data networks. For example, the data network 532 may include an IP multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example environment 500 may perform one or more functions described as being performed by another set of devices of example environment 500.

Figure 6:
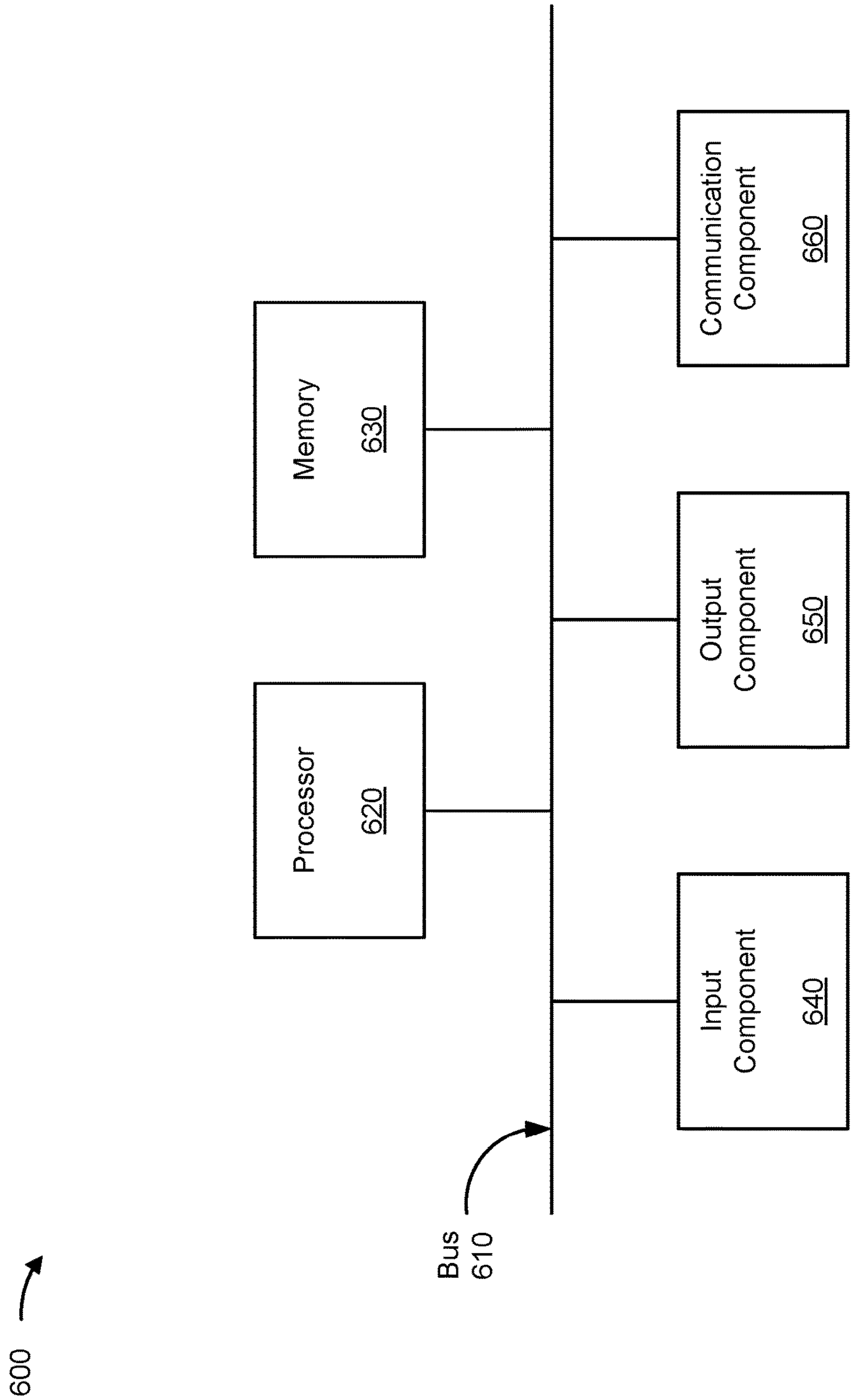
FIG. 6 is a diagram of example components of one or more devices of FIG. 5.

FIG. 6 is a diagram of example components of a device 600 associated with securely storing session keys. The device 600 may correspond to a UDM (e.g., UDM 514), and/or an AUSF (e.g., AUSF 516). In some implementations, the UDM and/or the AUSF may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
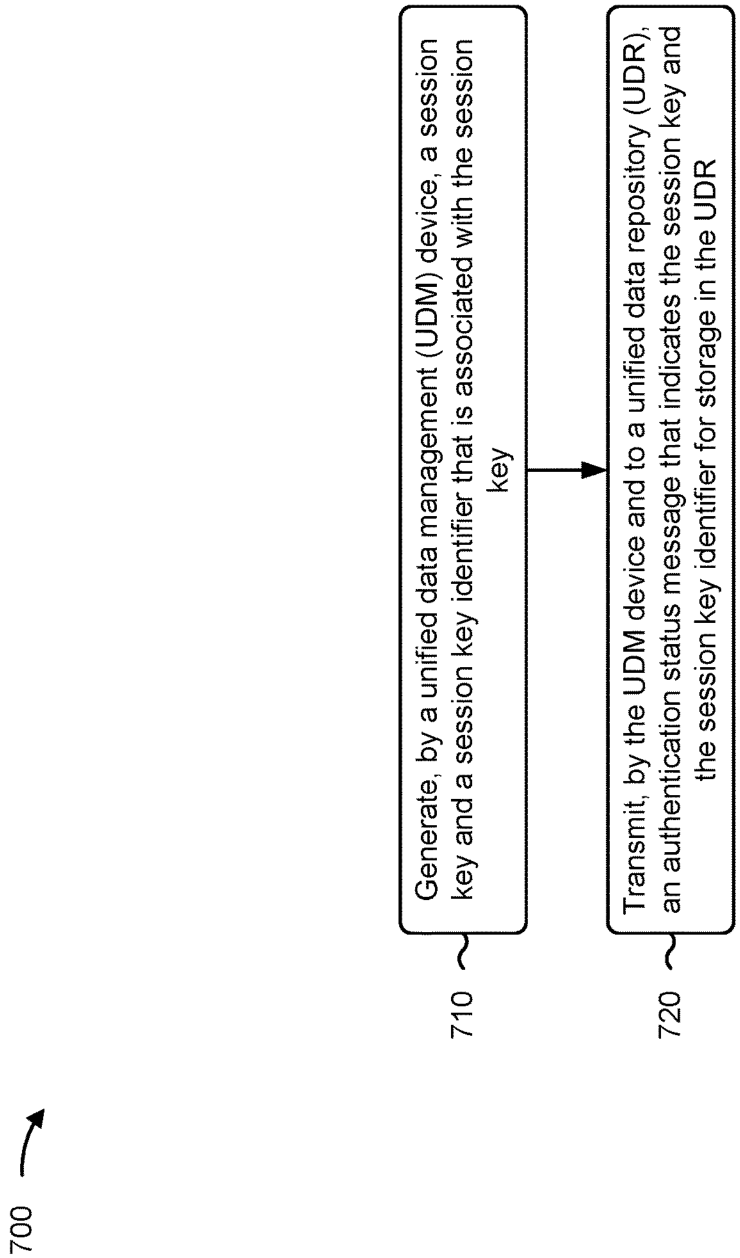
FIG. 7 is a flowchart of an example process associated with securely storing session keys.

FIG. 7 is a flowchart of an example process 700 associated with securely storing session keys. In some implementations, one or more process blocks of FIG. 7 may be performed by a UDM (e.g., UDM 514). In some implementations, one or more process blocks of FIG. 7 may be performed by another device or a group of devices separate from or including the UDM, such as an AUSF (e.g., AUSF 516). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include generating a session key and a session key identifier that is associated with the session key (block 710). The session key may be a $K_{AUSF}$, and the $K_{AUSF}$ may be a root key or a master session key that is available to the AUSF. The session key identifier may be a $K_{AUSF}$-Id, and the $K_{AUSF}$-Id may be a pseudo-random value or a decorated identifier that is used to uniquely identify the session key. The UDM may locally store the session key identifier after the session key identifier is generated.

As shown in FIG. 7, process 700 may include transmitting, to a UDR, an authentication status message, wherein the authentication status message indicates the session key and the session key identifier for storage in the UDR (block 720). The UDR may store the session key and the session key identifier that are received from the UDM.

In some implementations, the UDM may transmit, to the UDR, an authentication data message that indicates the session key identifier. The UDM may receive, from the UDR, a response that indicates the session key, where the received session key may be based on the session key identifier. The session key may be associated with a UE. The UDM may transmit, to the AUSF, which may be associated with an SoR protection service, an SoR message that indicates SoR information and the session key retrieved from the UDR.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
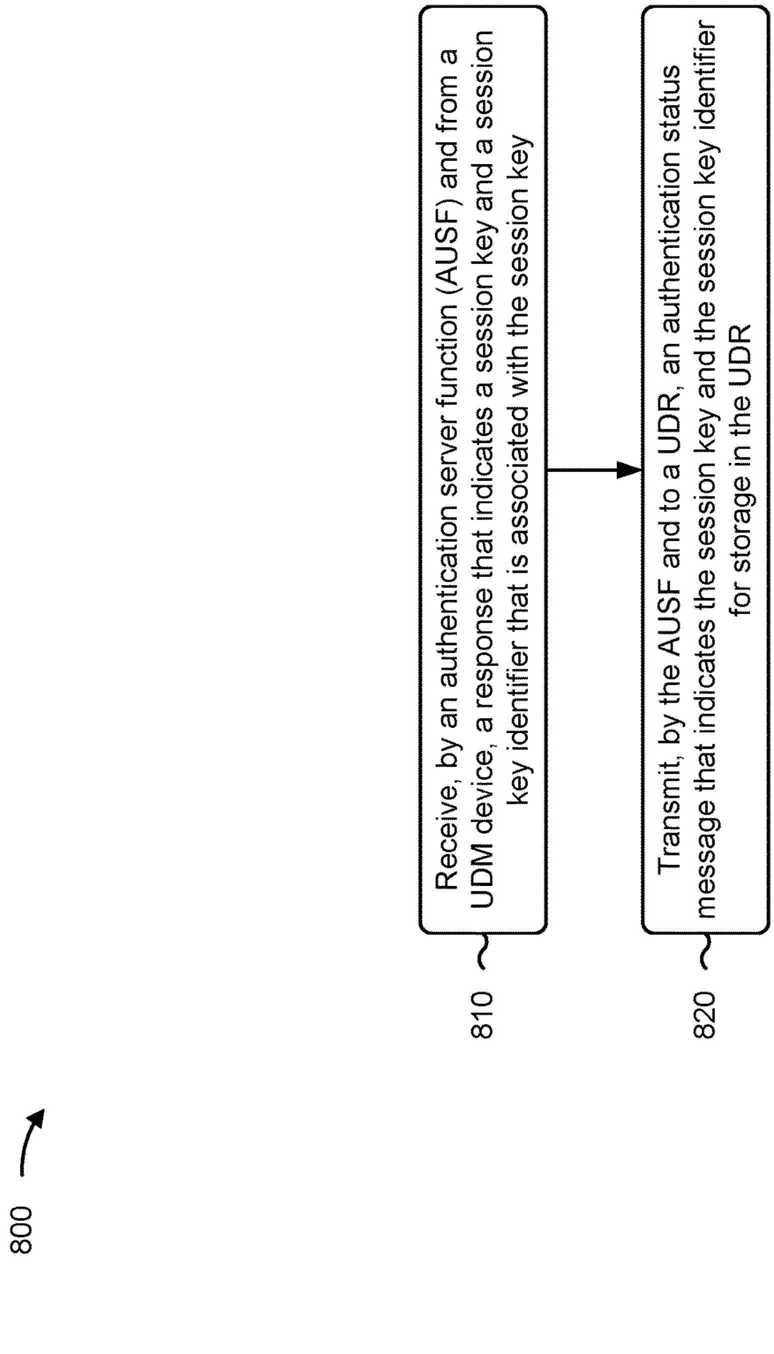
FIG. 8 is a flowchart of an example process associated with securely storing session keys.

FIG. 8 is a flowchart of an example process 800 associated with securely storing session keys. In some implementations, one or more process blocks of FIG. 8 may be performed by an AUSF (e.g., AUSF 516). In some implementations, one or more process blocks of FIG. 8 may be performed by another device or a group of devices separate from or including the AUSF, such as a UDM (e.g., AUSF 514). Additionally, or alternatively, one or more process blocks of FIG. 8 may be performed by one or more components of device 600, such as processor 620, memory 630, input component 640, output component 650, and/or communication component 660.

As shown in FIG. 8, process 800 may include receiving, from the UDM, a response that indicates a session key and a session key identifier that is associated with the session key (block 810). The response may indicate an authentication information result, and the authentication information result may indicate the session key and the session key identifier. The session key may be a $K_{AUSF}$, and the $K_{AUSF}$ may be a root key or a master session key that is available to the AUSF. The session key identifier may be a $K_{AUSF}$-Id, and the $K_{AUSF}$-Id may be a pseudo-random value or a decorated identifier that is used to uniquely identify the session key.

As shown in FIG. 8, process 800 may include transmitting, to the UDR, an authentication status message, wherein the authentication status message indicates the session key and the session key identifier for storage in the UDR (block 820). The AUSF may transmit the session key and the session key identifier for storage in the UDR based on a successful authentication completion.

In some implementations, the AUSF may receive, from the UDM, an SoR message that indicates SoR information and the session key, where the AUSF may be associated with an SoR protection service. The AUSF may transmit, to the UDR, an authentication data message that indicates the session key identifier. The AUSF may receive, from the UDR, a response that indicates the session key, where the received session key may be based on the session key identifier.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

transmitting, by a unified data management (UDM) device, to a unified data repository (UDR), and based on receiving a generate authentication data message from an authentication server function (AUSF) in a network, an authentication subscription message;

generating, by the UDM device and based on receiving a response from the UDR, a session key and a session key identifier that is associated with the session key;

transmitting, by the UDM device and to the UDR, an authentication status message, wherein the authentication status message indicates the session key and the session key identifier for storage in the UDR, and wherein the session key is retrievable from the UDR by any AUSF in the network, including the AUSF, using the session key identifier stored in the UDR;

transmitting, by the UDM device and to the UDR, an authentication data message that indicates the session key identifier; and receiving, by the UDM device and from the UDR, a response that indicates the session key, wherein the session key is received based on the session key identifier.

2. The method of claim 1, wherein the session key is a root key or a master session key that is available to the AUSF.

3. The method of claim 1, wherein the session key identifier is a pseudo-random value or a decorated identifier that is used to uniquely identify the session key.

4. The method of claim 1, further comprising:

storing the session key identifier locally at the UDM device.

5. The method of claim 1, further comprising:

transmitting, by the UDM device and to the AUSF, a steering of roaming (SoR) message that indicates SoR information and the session key retrieved from the UDR, wherein the AUSF is associated with an SoR protection service.

6. The method of claim 5, wherein the session key is associated with a user equipment (UE).

7. The method of claim 1, wherein the session key is indicated by a home environment authentication vector.

8. The method of claim 1, wherein the session key and the session key identifier are securely stored in the UDR.

9. A method, comprising:

transmitting, by an authentication server function (AUSF) in a network, to a unified data management (UDM) device, and based on receiving an authentication request from an access and mobility management function (AMF), a generate authentication data message;

receiving, by the AUSF and from the UDM device, a response that indicates a session key and a session key identifier that is associated with the session key;

transmitting, by the AUSF and to a unified data repository (UDR), an authentication status message, wherein the authentication status message indicates the session key and the session key identifier for storage in the UDR, and wherein the session key is retrievable from the UDR by any AUSF in the network, including the AUSF, using the session key identifier stored in the UDR;

transmitting, by the AUSF and to the UDR, an authentication data message that indicates the session key identifier; and receiving, by the AUSF and from the UDR, a response that indicates the session key, wherein the session key is received based on the session key identifier.

10. The method of claim 9, wherein the session key and the session key identifier are transmitted for storage in the UDR based on a successful authentication completion.

11. The method of claim 9, wherein the response indicates an authentication information result, and the authentication information result indicates the session key and the session key identifier.

12. The method of claim 9, wherein the session key is a root key or a master session key that is available to the AUSF.

13. The method of claim 9, wherein the session key identifier is a pseudo-random value or a decorated identifier that is used to uniquely identify the session key.

14. The method of claim 9, further comprising:

receiving, by the AUSF and from the UDM device, a steering of roaming (SoR) message that indicates SoR information and the session key, wherein the AUSF is associated with an SoR protection service.

15. The method of claim 9, wherein the session key is indicated by a home environment authentication vector.

16. A device, comprising:

one or more processors configured to:

transmit, to a unified data repository (UDR), based on receiving a generate authentication data message from an authentication server function (AUSF) in a network, an authentication subscription message;

generate, based on receiving a response from the UDR, a session key and a session key identifier that is associated with the session key;

transmit, to the UDR, an authentication status message, wherein the authentication status message indicates the session key and the session key identifier for storage in the UDR, and wherein the session key is retrievable from the UDR by any AUSF in the network, including the AUSF, using the session key identifier stored in the UDR;

transmit, to the UDR, an authentication data message that indicates the session key identifier; and receive, from the UDR, a response that indicates the session key, wherein the session key is received based on the session key identifier.

17. The device of claim 16, wherein the session key is a root key or a master session key that is available to the AUSF and one or more other AUSFs in the network.

18. The device of claim 16, wherein the session key identifier is a pseudo-random value or a decorated identifier that is used to uniquely identify the session key.

19. The device of claim 16, wherein the one or more processors are further configured to:

transmit, to the AUSF, a steering of roaming (SoR) message that indicates SoR information and the session key retrieved from the UDR, wherein the AUSF is associated with an SoR protection service.

20. The device of claim 19, wherein the session key is associated with a user equipment (UE).

* * * * *